(12) United States Patent
Kim et al.

(10) Patent No.: US 8,766,922 B2
(45) Date of Patent: Jul. 1, 2014

(54) INPUT UNIT, MOVEMENT CONTROL SYSTEM AND MOVEMENT CONTROL METHOD USING THE SAME

(75) Inventors: Hyun Jin Kim, Gwangju (KR); Han Chul Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 599 days.

(21) Appl. No.: 12/552,662

(22) Filed: Sep. 2, 2009

(65) Prior Publication Data

US 2010/0053078 A1 Mar. 4, 2010

(30) Foreign Application Priority Data

Sep. 2, 2008 (KR) .................. 10-2008-0086399

(51) Int. Cl.
*G06F 3/02* (2006.01)
(52) U.S. Cl.
USPC .......................................... 345/169; 345/168

(58) Field of Classification Search
None
See application file for complete search history.

(56) References Cited

U.S. PATENT DOCUMENTS

| 7,009,595 B2 * | 3/2006 | Roberts et al. ................ 345/156 |
| 2004/0029082 A1 * | 2/2004 | Fournier et al. ................ 434/112 |
| 2006/0046031 A1 * | 3/2006 | Janevski .................... 428/195.1 |
| 2006/0238510 A1 * | 10/2006 | Panotopoulos et al. ....... 345/168 |
| 2007/0247420 A1 * | 10/2007 | Strohband et al. ............. 345/156 |
| 2009/0015560 A1 * | 1/2009 | Robinson et al. ............. 345/168 |

* cited by examiner

*Primary Examiner* — Adam R Giesy
(74) *Attorney, Agent, or Firm* — H.C. Park & Associates, PLC

(57) ABSTRACT

Exemplary embodiments of the present invention relate to a movement control method and system of a terminal input unit having a plurality of protrusions. Exemplary embodiments of the present invention disclose a process and an apparatus for controlling each protrusion so that the input unit forms interface modes used for a function control according to a user function of the terminal.

14 Claims, 12 Drawing Sheets

INPUT UNIT, MOVEMENT CONTROL SYSTEM AND MOVEMENT CONTROL METHOD USING THE SAME

CROSS REFERENCE TO RELATED APPLICATION

This application claims priority from and the benefit of Korean Patent Application No. 10-2008-0086399, filed on Sep. 2, 2008, which is hereby incorporated by reference for all purposes as if fully set forth herein.

BACKGROUND OF THE INVENTION

1. Field of the Invention

Exemplary embodiments of the present invention relate to a movement control method and system of an input unit of a terminal, and more particularly, to a mechanical movement control method and system of a tactile input unit so that an input part can have various shapes corresponding to an interface mode used to support various user functions of the terminal.

2. Description of the Background

Recently, portable terminals have been widely used based on mobility. In particular, among portable terminals, a mobile terminal that can perform a phone call is used by 85% or more of the people who use a mobile terminal. In addition to making and receiving phone calls, the mobile terminal can have various functions. For example, a typical portable terminal can be equipped with a MP3 function or an image collection function corresponding to a digital camera capable of taking images. Moreover, a typical portable terminal supports a function that can perform a mobile game or an arcade game. A portable terminal may also include a touch screen with an input signal generation method, so that the portable terminal may be controlled according to the generation of a touch event. With the touch screen, a user can more softly and rapidly control the portable terminal's operation.

However, the typical portable terminal provides a simple service of outputting to a display unit by simply processing data according to a user input signal or regenerating data stored in the portable terminal. Accordingly, a terminal having an input unit capable of accomplishing the satisfaction of the senses of a user by applying more dynamic interaction according to data conversion is required.

SUMMARY OF THE INVENTION

Exemplary embodiments of the present invention provide an input unit and an input unit movement control method and system where a type of the input unit is configured to be different according to an operation of the terminal so that a user can have a more dynamic and sensitive input unit.

Additional features of the invention will be set forth in the description which follows, and in part will be apparent from the description, or may be learned by practice of the invention.

An exemplary embodiment of the present invention discloses a method of controlling an input unit of a terminal. The method includes determining an interface mode corresponding to a user function provided by a terminal, and performing at least one of protruding, sinking, maintaining, and illuminating a protrusion in an input unit comprising a plurality of protrusions, thereby forming a shape on the input unit corresponding to the interface mode.

An exemplary embodiment of the present invention also discloses a method of controlling an input unit of a terminal that includes uniformly arranging each protrusion of an input unit comprising a plurality of protrusions; detecting a touch event on the input unit; and performing at least one of protruding, sinking, maintaining, and illuminating the protrusions, thereby forming a shape on the input unit corresponding to an interface mode corresponding to a current user function, in response to the touch event.

An exemplary embodiment of the present invention also discloses an apparatus for controlling an input unit of a terminal. The apparatus includes an input unit including a plurality of protrusions; a storage to store an interface mode for configuring the input unit with a shape corresponding to a user function provided by the terminal; and a controller to control the input unit to have the shape by at least one of protruding, sinking, maintaining, and illuminating the protrusions.

An exemplary embodiment of the present invention also discloses an input unit of a terminal. The input unit includes a plurality of protrusions disposed in a matrix. Each protrusion includes an up and down motion unit to control an up and down motion of the protrusion; a touch sensor disposed on the up and down motion unit; and a lid unit covering the touch sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
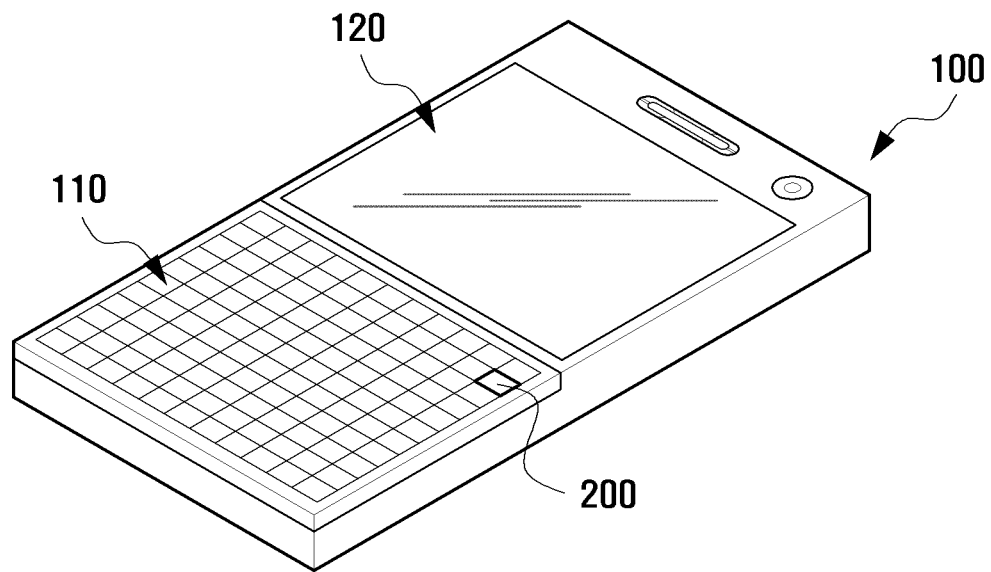
FIG. 1 is a drawing illustrating a schematic configuration of a terminal according to an exemplary embodiment of the present invention.

Exemplary embodiments of the present invention are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, operations according to exemplary embodiments of the present invention are described on the assumption that each protrusion performs an operation corresponding to one of projection, sinking, and maintenance in such a manner that a button necessary for the function of the terminal is formed in each section of divided sections, after a plurality of protrusions of the input unit are disposed in matrix and the matrix of protrusions is divided by given section. Here, it is illustrated that the input unit is divided into first to N sections of protrusions, and the protrusions operate in such a manner that a certain button may be formed in each divided section. Here, for the sake of convenience in illustration, a symbol such as "A, B, C, . . . " may be assigned to each section.

FIG. 1 is a drawing illustrating a schematic configuration of a terminal according to an exemplary embodiment of the present invention.

Referring to FIG. 1, a terminal 100 includes a display unit 120 in the upper portion of a frame and an input unit 110 below the display unit 120 in the lower portion of the frame. The terminal 100 configures the form of the input unit 110 with a form that corresponds to an interface mode of various interface modes used during operations of the terminal 100, for example, operations including a booting operation, a phone call function, a file playing function, a menu selection function, and a list search function for a photo or the like. In addition, the terminal 100 controls in such a manner that a screen pertinent to a corresponding function is displayed on the display unit 120 in response to an input signal inputted by the input unit 110 and can activate a corresponding user function.

The display unit 120 outputs a preset screen according to various operations of the terminal 100. For example, when the terminal 100 is performing a booting operation, the display unit 120 can output a preset screen corresponding to the booting operation followed by a preset stand-by screen after the booting operation is completed. This display unit 120 can output an input signal inputted by the input unit 110. That is, when the terminal 100 is performing a call function, the input unit 110 can be configured with an interface mode used for the performance of the phone call function, and the display unit 120 can output at least one of a number and a character corresponding to a signal inputted by a user among numbers and characters formed in each section of the input unit 110, to a screen. Moreover, the display unit 120 can output a screen that is set up according to characteristics of a file during the playing of the file. Here, if the file is a music file, the display unit 120 can output a preset screen or a specific screen included in the file, and can output a corresponding image if the file is an image file like a movie file. The display unit 120 can also output a corresponding menu and a submenu linked to the menu when the terminal 100 performs the menu selection function or the list search function for a photo or the like, and can output an image such as photo or the like with a multi image.

The input unit 110 can be configured to have various interface modes according to the various user functions of the terminal 100. This input unit 110 in which a plurality of protrusions 200 of tactile type is arranged in one side of the frame of the terminal 100 operates as an input part. That is, in the input unit 110, a plurality of protrusions 200 may be disposed in a certain surface in a matrix, and a plurality of protrusions 200 are used to configure an interface mode, for example, configure a shape of button according to the operation of terminal 100. To this end, a plurality of protrusions 200 may have a configuration that protrudes upward or sinks downward from one side of the terminal 100. The protrusion 200 of the input unit 110 and the arrangement of the input unit 110 is illustrated in detail with reference to FIG. 2A, FIG. 2B, and FIG. 3.

Figure 2A:
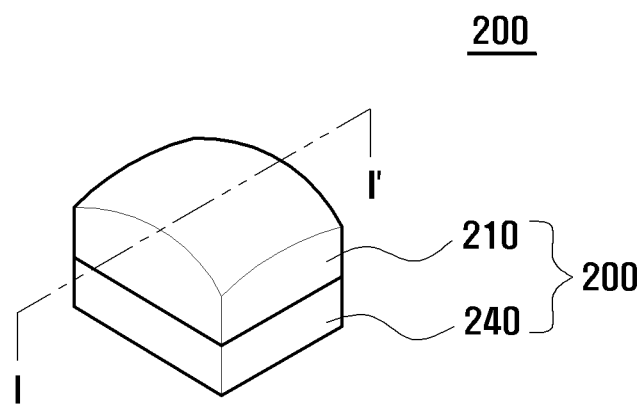
FIG. 2A and FIG. 2B are drawings illustrating a configuration of FIG. 1.
Figure 2B:
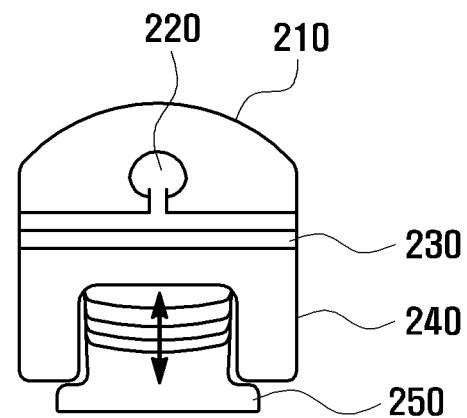

FIG. 2A is a drawing illustrating an enlarged protrusion 200 among a plurality of protrusions of the input unit 110 according to an exemplary embodiment of the present invention. FIG. 2B is a cross-sectional view illustrating a cross section taken along line I-I' of FIG. 2A.

Referring to FIG. 2A and FIG. 2B, the protrusion 200 may include a lid unit 210, a light emitting diode 220, a touch sensor 230, a supporting unit 240, and a motor 250. The protrusion 200 may move upward and downward by operation of the motor 250 under the control of the controller of the terminal 100 and, at this time, may also emit light when power is supplied to the light emitting diode 220. Whether protruded, sunk, or level in relation to other protrusions 200, the protrusion 200 senses a contact of a user by using the touch sensor 230, and generates a contact signal corresponding to the sensed contact of user and transmits the signal to the controller of the terminal 100.

The lid unit 210 is disposed on the upper end of the supporting unit 240 and has a configuration of surrounding the light emitting diode 220 inside. The lid unit 210 may be made of a material like silicon, plastic, and polyurethanes of transparent and translucent material so that it may transmit light emitted from the light emitting diode 220 to the outside. The lid unit 210 forms a space in which the light emitting diode 220 can be mounted. A signal line for supplying power to the light emitting diode 220 can be disposed between the lid unit 210 and the supporting unit 240. The light emitting diode 220 is disposed inside the lid unit 210, and it is provided with power from a diode driving unit, thereby causing the light emitting diode 220 to illuminate.

The light emitting diode 220 may be disposed inside the lid unit 210 so that it closely adheres to the lid unit 210. This may minimize the pressure delivered to the light emitting diode 220 when a user contacts the lid unit 210. Here, the light emitting diode 220 may physically contact the inner side of the lid unit 210. The light emitting diode 220 may be formed by a plurality of light emitting diodes so that each protrusion may display three or more colors. The light emitting diode 220 can emit light under a preset control. For example, the light emitting diode 220 can emit light after being provided with a power while the protrusion 200 protrudes or sinks. The light emitting diode 220 can be omitted in consideration of the cost of design and the manufacturing process. The touch sensor 230 can apply a capacitive overlay technology in which the touch sensor 230 is disposed between the lid unit 210 and the supporting unit 240, so that the capacitance changes as a distance between the supporting unit 240 and the lid unit 210 changes by a pressure applied by a user pressing the lid unit 210. In this manner, the contact of the user can be sensed.

To this end, a certain air gap is formed between the lid unit 210 and the supporting unit 240. Two substrates can be disposed with a capacitor type, where the two substrates are disposed to face each other while having a certain electric charge on one side of the lid unit 210 and one side of the supporting unit 240, respectively. A signal line may be prepared in both substrates respectively, and can send a touch signal to the controller of the terminal 100 in response to the contact of the user.

According to exemplary embodiments of the present invention, the touch sensor 230 is illustrated based on a capacitive overlay technology. However, it should be noted that various types of touch sensors can be used, such as a resistive overlay technology that senses the touch of the user by sensing the change of resistance with the touch of the user after preparing a signal line in one side of the lid unit 210. The supporting unit 240 supports the lid unit 210 and the light emitting diode 220 inside the lid unit 210, while supporting the lid unit 210 when the protrusion 200 protrudes and sinks according to the up and down operation of the motor 250.

This supporting unit 240 can be made of a material that is similar to the lid unit 210, that is, silicon or plastic or the like, and it can have a space in which the motor 250 is disposed. A signal line for supplying power to the light emitting diode 220 and a signal line for sending a signal according to the touch sensing of the touch sensor 230 can be disposed in one side of the supporting unit 240. The motor 250 is disposed inside the supporting unit 240, and it moves the supporting unit 240 and the lid unit 210 up and down under the control of the motor driver.

In more detail, when a user presses one side of the lid unit 210, the pressure stimulates the touch sensor 230, so that each protrusion 200 that was pressed notifies the controller of the terminal 100 that a touch was generated in the pressed protrusion 200. Then, the controller of the terminal 100 sends a control signal to the motor/diode driving unit 150 so as to protrude or sink the protrusion 200 in which a touch is generated according to a preset control, and the motor/diode driving unit 150 can control the rotating operation of the motor 250 to control the upward and downward movement of the protrusion 200.

In the meantime, in the present invention, it is illustrated that the motor 250 was prepared in the inner side of the supporting unit 240 so that the supporting unit 240 and lid unit 210 be protruded and sunk. Although FIG. 2B shows the motor 250 being used to move the protrusion 200 up and down, other mechanisms may be used. For example, a material (i.e. smart fluid) that expands based on an electric charge of the power which is provided when power is supplied and contracts when the supplied power is discontinued may be used instead of the motor 250. Although described as two separate components, the supporting unit 240 and the motor 250 can be integrated into one configuration.

As described above, according to an exemplary embodiment of the present invention, a plurality of protrusions 200 are disposed in one side of the terminal 100 in a matrix and each protrusion 200 can perform a protruding operation and a sinking operation upward and downward according to a preset control and can emit light by using the light emitting diode 220, so that an input unit which is tactile, active, and visual can be provided to a user.

Figure 3:
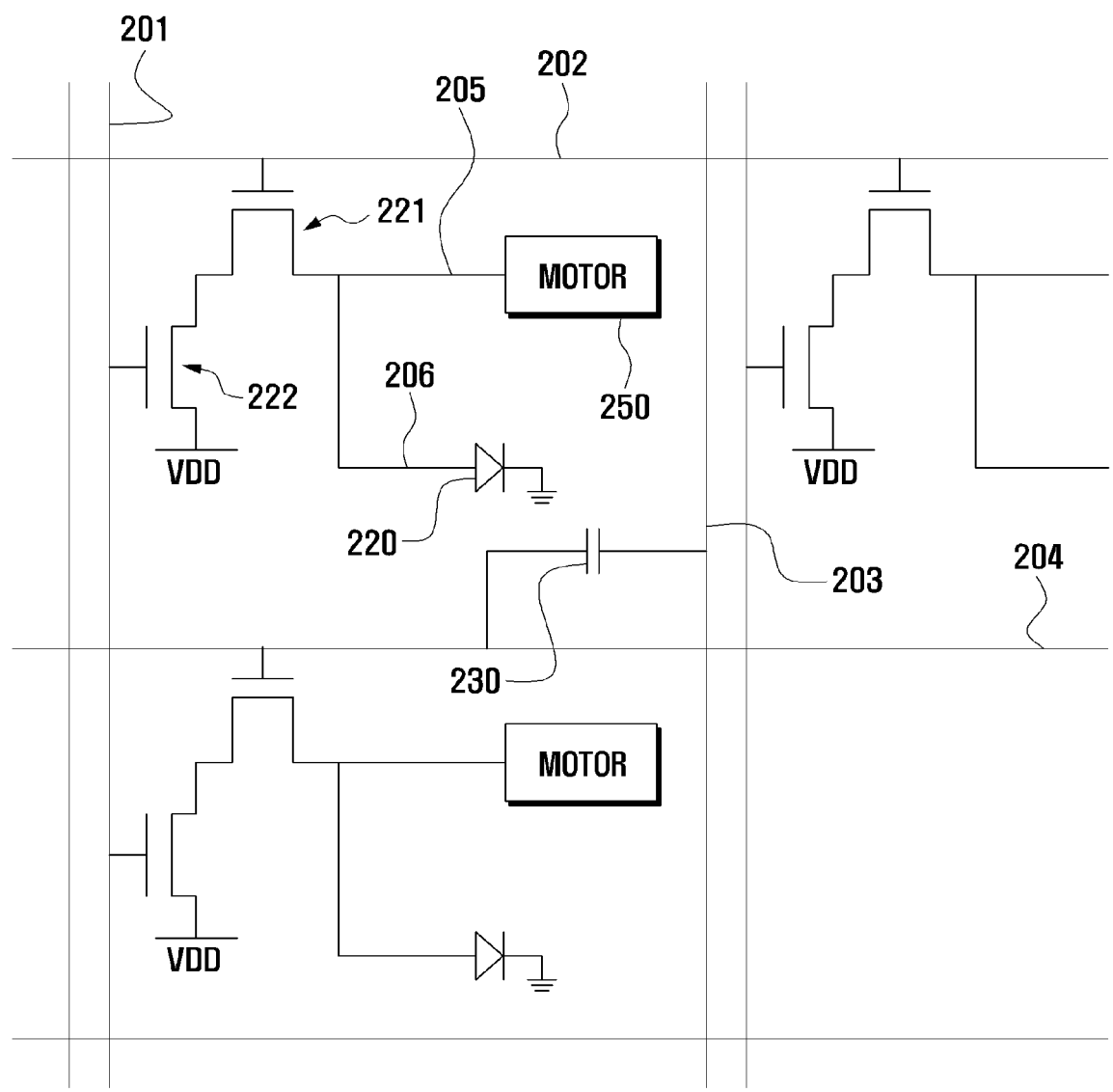
FIG. 3 is part of a circuit configuration for an operation of an input unit according to an exemplary embodiment of the present invention.

FIG. 3 is a partial circuit diagram that schematically illustrates a signal wiring for an arrangement of a plurality of protrusions according to an exemplary embodiment of the present invention.

Referring to FIG. 3, a signal wiring of the input unit 110 may include a first signal line 201 and a second signal line 202 for supplying a power to the motor 250 and the light emitting diode 220, a first switch 221 connected to the second signal line 202, a second switch 222 connected to the first signal line 201, a power source VDD, which is connected to one side of the second switch 222 to supply a power, a first power supply line 205, which connects the first switch 221 and the motor 250, a second power supply line 206, which connects the light emitting diode 220 to the first switch 221, and a third signal line 203 and a fourth signal line 204, which are connected to the touch sensor 230 respectively.

This configuration can form a power supply path in such a manner that when a power is supplied to the first signal line 201 and the second signal line 202 so as to operate the motor 250, the first switch 221 and the second switch 222 are activated so that a power from the power source VDD is supplied to the motor 250 through the second switch 222 and the first switch 221.

At this time, the power of the power source VDD can be supplied to the light emitting diode 220 through the second switch 222, the first switch 221, and the second power supply line 206. In FIG. 3, a power that is supplied to the motor 250 is also supplied to the light emitting diode 220. Alternatively, if necessary, a power supply path for the motor 250 and a power supply path for the light emitting diode 220 can be separately designed. The touch sensor 230 is connected to the third signal line 203 and the fourth signal line 204, which are separately prepared. If a change of the capacity occurs in the touch sensor 230, the touch sensor 230 can send a contact signal to the controller of the terminal 100, which indicates that a contact of a user was sensed in a corresponding protrusion 200.

Figure 4:
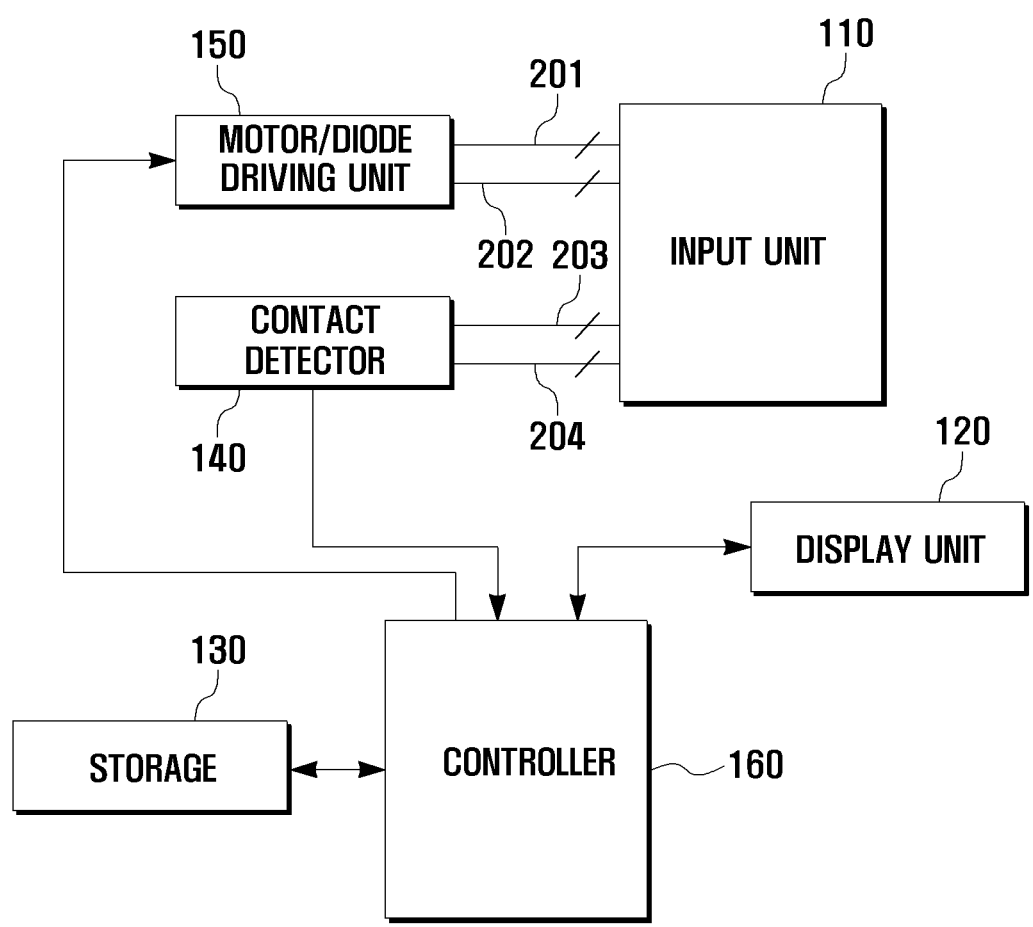
FIG. 4 is a block diagram illustrating a schematic configuration of a terminal according to an exemplary embodiment of the present invention.

FIG. 4 is a block diagram illustrating a schematic configuration of a terminal according to an exemplary embodiment of the present invention.

Referring to FIG. 4, as described above, a terminal can include an input unit 110, a display unit 120, a storage 130, a motor/diode driving unit 150, a contact detector 140, and a controller 160. Here, the motor/diode driving unit 150 and the contact detector 140 can be included in the input unit 110.

The storage 130 stores content sent from outside the terminal such as from other terminals or a server, in addition to application programs used for the terminal's operation. The storage 130 stores data corresponding to a shape that will be implemented on the input unit 110 according to content that is outputted to the display unit 120, and can send pertinent data to the controller 160 corresponding to contents that are changed during terminal operations. The storage 130 can include a program area and a data area. The program area stores an operating system (OS) for booting the terminal, and an application program for the support of various terminal functions, for example, application programs for the support of a phone call function, a file playing function, a menu selection function, and a list search function for photos or the like.

Particularly, the program area may store an input unit operation control program, can send a specific interface mode to the controller 160 so as to alter the shape of the input unit 110 according to the terminal usage by a user. When the terminal activates the above-described functions corresponding to a user's request, each function is provided by using corresponding applications under the control of the controller 160. The input unit operation control program controls the operation of the input unit 110 according to the terminal usage by a user and the change in content that is outputted to the display unit 120.

The data area is an area in which data generated during use of terminal are stored, and can store user data relating to various option functions, for example, can store a photographed image or a moving picture by a camera function when the terminal includes a camera, phone book data, audio data, and information corresponding to the above-described content or user data. Particularly, the data area can store a plurality of interface modes corresponding to a specific shape of the input unit 110. These interface modes are a value for implementing the structure of the input unit 110 corresponding to the pertinent function support and the content when the terminal 100 uses a specific content or a specific function of the terminal according to the usage of user. For example, when the terminal 100 tries to activate the call function according to user request, the interface mode can be a data value that makes the input unit 110 to be in a shape corresponding to a number and character key.

That is, the interface mode is a set up value that causes some protrusions 200 among a plurality of protrusions 200 disposed in the input unit 110 to protrude while other protrusions 200 are sunk or maintained, for example, it can be a set up value that causes the protrusions 200 corresponding to the number 1, 2, 3, . . . , 0, respectively, to protrude while other protrusions 200 are sunk or maintained. The motor/diode driving unit 150 is a driving unit that is configured to operate a plurality of motors 250 and the light emitting diodes 220 included in the input unit 110, respectively. This motor/diode driving unit 150 generates a signal that determines which protrusion 200 is protruded or which protrusion 200 is sunk according to each interface mode which is stored in the data area, and sends a signal to each motor 250. The motor/diode driving unit 150 can supply power, which can activate the light emitting diode 220, to the motor 250 to which the power is supplied. That is, the protruded protrusion 200 may also emit light using the light emitting diode 220. The contact detector 140 is a sensor that checks a specific protrusion 200 in which a contact of user was generated among protrusions 200, and is connected to each touch sensor 230 included in a plurality of protrusions 200 to examine the change of the capacitance value of the touch sensor 230. Thus, the contact detector 140 can check a specific protrusion 200 in which a contact of user was generated. Accordingly, the contact detector 140 can send information regarding the intensity of a user's press on the lid unit 210 to the controller 160. The controller 160 can control the protruding height and the sinking depth of the protrusion 200, or maintain the current position of the protrusion 200, according to a signal from the contact detector 140. The controller 160 controls a signal flow between each configuration of the terminal 100, and controls each function so that each configuration may perform an operation according to an exemplary embodiment of the present invention. In more detail, if a user wants to use various user functions of the terminal 100, the controller 160 can determine the protruding, the sinking, and the light emission of each protrusion 200 so that the form of the input unit 110 may change according to corresponding function activation and corresponding function support. The alteration of the structure of the input unit 110 according to the operation of the controller 160 is described in detail below with reference to drawings.

FIGS. 5A to 11 are drawings about a method of altering a shape of the input unit according to a user function of the terminal according to exemplary embodiments of the present invention.

Figure 5A:
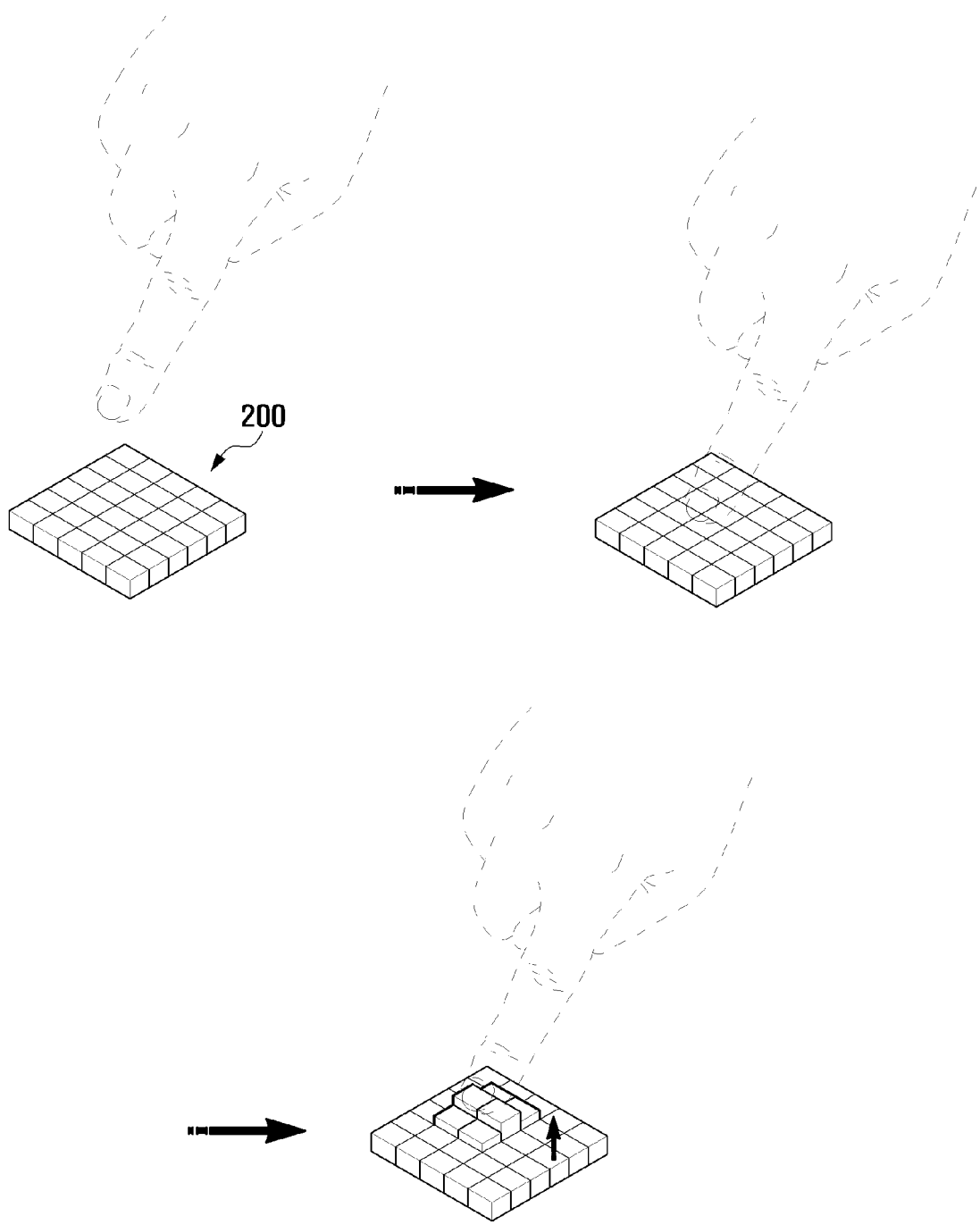
FIG. 5A and FIG. 5B are drawings illustrating an operation of an input unit in response to a touch according to an exemplary embodiment of the present invention.
Figure 5B:
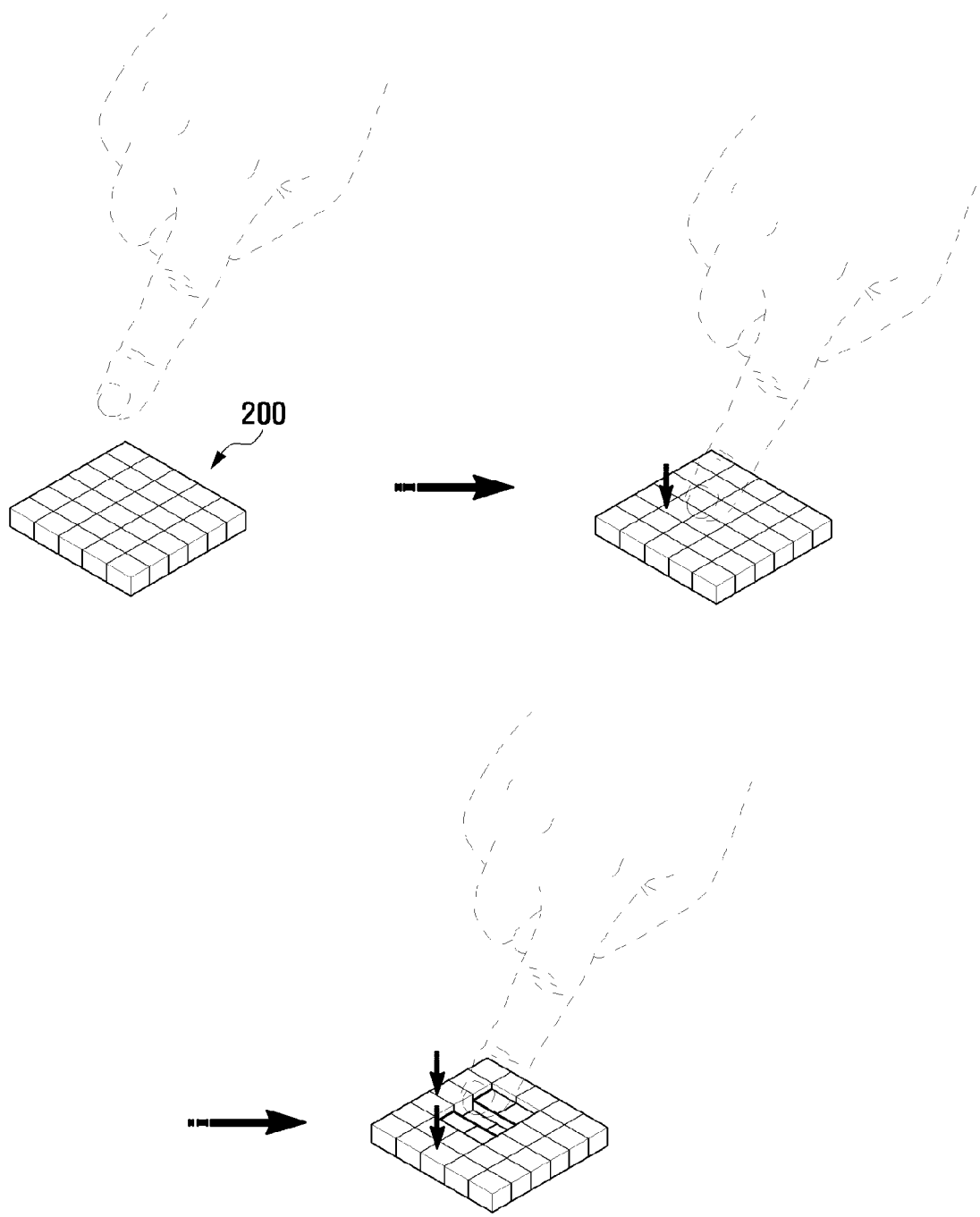

FIG. 5A and FIG. 5B show the protruding, the sinking, and the maintenance of protrusions according to a user touch according to exemplary embodiments of the present invention.

Referring to FIG. 5A, if a finger of user or the like contacts the protrusion 200, the protrusion 200 measures the amount of change of the capacity that is generated while being contacted, by using a touch sensor 230 included in the protrusion 200, and sends the sensed value to the controller 160. The controller 160 then determines a location of the contact area, and controls the motor/diode driving unit 150 so that the protrusion 200 of the contact area may protrude higher than the neighboring protrusions.

The motor/diode driving unit 150 receives a signal for protruding the protrusion 200 from the controller 160, and commands a rotation number to the motor 250 after calculating the rotation number of the motor 250. The motor 250 then rotates as much as the rotation number according to a signal received from the motor/diode driving unit 150. Consequently, the protrusion 200 can be protruded by the rotation of the motor 250. In this process, the controller 160 can command the motor/diode driving unit 150 to also supply power to the light emitting diode 220. Accordingly, the motor/diode driving unit 150 can supply power to the light emitting diode 220, which is included in the protruded protrusion 200. Accordingly, the protrusions 200 contacted by a user can have a certain color and can emit light while also being protruded. In this process, the controller 160 can also determine the pressure with which the user pressed the protrusion 200 according to the sensed value received from the contact detector 140. For example, when the user presses the touch sensor 230 of a specific protrusion 200 with a given force, a distance between plates of a capacitor that serves as a touch sensor 230 changes. The controller 160 can determine the magnitude of the pressure on a specific protrusion 200 by using the change of the distance between the plates of the capacitor. That is, when the user's finger presses the plane in which the protrusions 200 are disposed, the magnitude of the pressure applied to the protrusion by the fingertip can be greater than that applied by other parts of the finger. Accordingly, as shown in FIG. 5A, the protrusion(s) 200 contacted by the user's fingertip may protrude higher than the neighboring protrusion(s), while the protrusions 200 contacted by a different part of the user's finger (i.e., not the fingertip) may protrude lower than the protrusion 200 contacted by the fingertip.

Alternatively, referring to FIG. 5B, if a user's finger or the like contacts the protrusion 200, the protrusion 200 measures the amount of change of the capacity that is generated while being contacted, by using a touch sensor 230, and the sensed value is sent to the controller 160 by the contact detector 140. In this case, unlike in FIG. 5A, the controller 160 controls the motor/diode driving unit 150 so that the contacted protrusion (s) 200 is sunk lower than the neighboring protrusion(s). Accordingly, the motor/diode driving unit 150 receives a signal for sinking the protrusion 200 from controller 160, and commands to the motor 250 to rotate as much as the calculated number of rotations after calculating the number of rotations of the motor 250. The motor 250 then rotates in reverse with a given number according to a signal received from the motor/diode driving unit 150. Consequently, the protrusion 200 can sink by the reverse rotation of the motor 250. In this process, the controller 160 can command the motor/diode driving unit 150 to supply power to the light emitting diode 220, accordingly, the motor/diode driving unit 150 can supply power to the light emitting diode 220 included in the sinking protrusion(s) 200. Accordingly, the protrusions 200 contacted by the user can have a certain color and can emit light while sinking. In this process, as shown in FIG. 5B, the controller 160 can control a specific protrusion 200 in such a manner that the specific protrusion 200 sinks more deeply than other protrusions 200 according to the magnitude of the pressure applied to the protrusion 200.

In FIG. 5A and FIG. 5B, the power supplied to the light emitting diodes 220 disposed in a specified section can be controlled so that the input unit 110 may indicate in advance an area to be touched by a user. For example, in order to support the phone call function, which is a basic function of mobile communications terminal, the controller 160 can control the power supplied to the light emitting diodes 220 in such a manner that the whole matrix area of the input unit 110 is divided into sections and the protrusions 200 disposed in each section display a number or a specific character. Then, in the state where all protrusions 200 are maintained with the same height in the input unit 110, each section displays a number or a character by illuminating selected light emitting diodes 220 in the section. Thereafter, if the user touches a section, exemplary embodiments of the present invention can provide, as described above, a more active input part as the touched protrusion 200 rises or sinks. This function can be applicable not only to an interface mode in which a number or character for the support of phone call function is displayed, but also identically applicable to various supports of user functions and the activation of functions as described below. In these operations, the controller 160 can differently set the height of the protruding and the depth of the sinking of the touched protrusions 200 according to the magnitude of the pressure that is generated in the touch. The controller 160 can also control the magnitude of the brightness of the emitted light from each protrusion 200 according to the magnitude of the pressure of the touch when the light emitting diode 220 emits light. Moreover, as described above, an area in which the protrusions 200 protrude or sink with a given height can be appeared on an area in which a button that is used depending upon the function of the terminal is touched.

For example, if the terminal generates a music file, the input unit 110 may provide a specific shape according to an interface mode including a button that can select and play an initial music file. Thereafter, the input unit 110 may be maintained such that the protrusions 200 have the same height and the same color without a separate button shape when the selected music is played, and, if the user touches a specific area of the input unit 110, the protrusions 200 can be protruded or sunk so that the input unit 110 may have an interface corresponding to buttons for the playing control, for example, a rewind button, a pause button, a fast forward button, and a volume control button, in the touched area, according to a touch event.

That is, the input unit 110 does not form an interface on a preset area of the input unit 110, but can control in such a manner that a corresponding button is formed in the touched spot. If the user executes the pause function so that a file is temporarily stopped, the controller 160 can control to initialize all protrusions 200 of the input unit 110 after a certain time, and have the same height and the same color. Then, as described above, if the user wants to play a file and touches a given area, the controller 160 can control the protruding or the sinking of the protrusions 200 so that an interface corresponding to the play button may be formed in the touched area. In this process, as described above, the controller 160 can determine not only the area of the touch but also the height of the protruding or the sinking by calculating a pressure and can control the brightness and the color of the emitted light.

Figure 6:
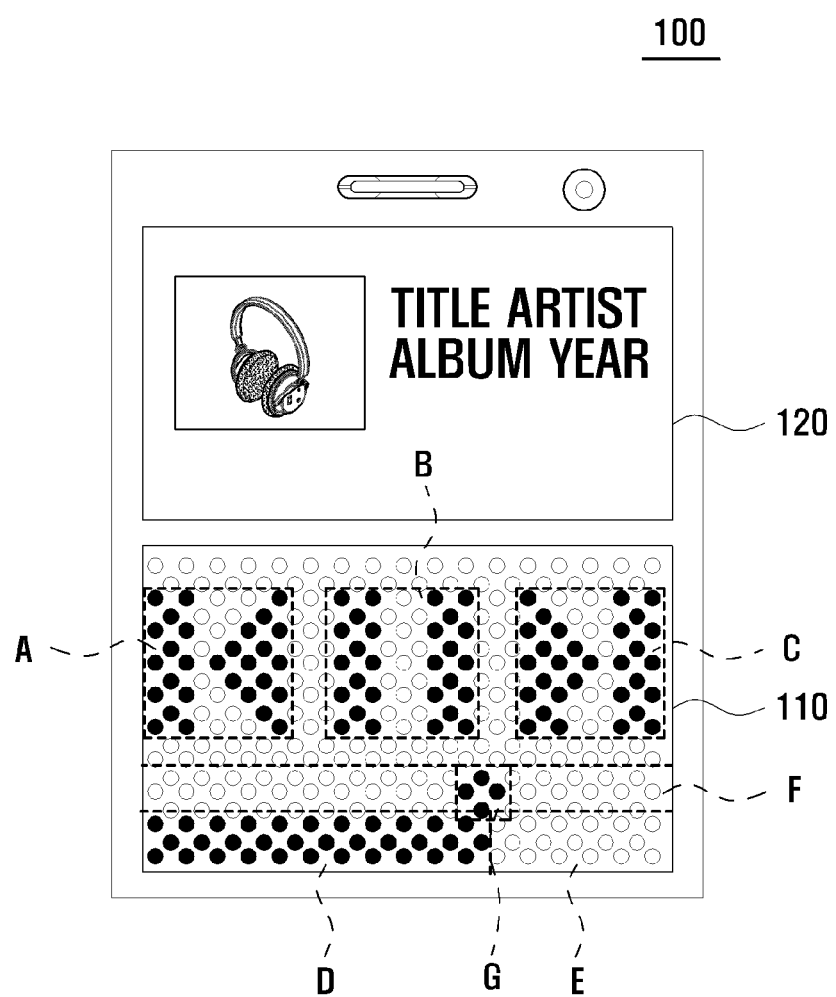
FIG. 6 is a drawing illustrating an input unit according to a file playing control operation according to an exemplary embodiment of the present invention.

FIG. 6 is a drawing illustrating a structure of an input unit according to a file playing function among functions of a terminal according to an exemplary embodiment of the present invention.

Here, it is assumed that the protrusions 200 displayed as a black spot indicate protrusions 200 that emit light or are protruded or sunk, whereas the protrusions 200 displayed as a white spot indicate protrusions 200 that have no change of height and protrusions 200 that emit light of a different color from that of the protruded or sunk protrusions 200, or indicate the protrusions 200 maintain the initial state in which they do not emit light. Moreover, the input unit 110 can form an interface mode corresponding to a number and a character for the support of phone call function, in the state where the stand-by screen is displayed in the display unit 120, after the booting is completed. In this process, the input unit 110 can have an interface in which a button corresponding to an additional key such as a menu activation key, and a file selection key, or the like is prepared.

Referring to FIG. 6, if a user wants to play a specific file, for example, a music file, which is stored in the storage, the user can select a menu button in an interface mode in which the menu button is activated, and can select a file for playing by performing a file search. Accordingly, the input unit 110 can form buttons used for the control of file playing. In more detail, in the interface mode in which the menu button is activated, if a specific file is searched, the controller 160 of the terminal controls the input unit 110 and divides the whole matrix into sections and implements an interface mode in which a button used for the playing of the file is shaped in each divided section.

For example, the controller 160 can implement an interface mode including a "playing" button for playing a selected file in a specific section of the input unit 110. That is, if the user selects a file, the controller 160 controls certain protrusions 200 to be protruded in comparison with other protrusions 200 to form a triangle or an arrow so that a play button for playing a selected file, for example, an arrow or a triangular shape, may be configured on the input unit 110. While a specific file is being played, as shown in drawing, the controller 160 may control the input unit 110 in such a manner that a button that can provide a function of stopping the playing of the file, rewind, or fast forward can be implemented.

Accordingly, in the input unit 110, as shown in section "A" (i.e., rewind), certain protrusions 200 may be protruded higher than other protrusions 200 so that a button of rewind shape can be formed, while, as shown in section "B", certain protrusions 200 are protruded to form a button of a 11 shape so that a button indicating "pause" can be configured. Moreover, the controller 160 can control the protruding of the protrusions 200 so that a button shape corresponding to fast forward may be protruded in section "C". Further, in one side of the input unit 110, section "D" and section "E" can exist, which indicate the extent of playing a file in the full playing of the file.

Here, section "D" can be an area indicating the extent of the file has played, and section "E" can be an area indicating the remaining portion of the file. Here, the controller 160 can control in such a manner that the protrusions 200 of section "D" protrude with a first height while having a first color. Here, the controller 160 can control in such a manner that the protrusions 200 of section "E" protrude with a second height while having a second color. If a user wants to play a selected file by using an interface mode including the above-described "play" button, the terminal activates a file playing application program stored in the storage so as to play a corresponding file, and plays the selected file.

In this process, the controller 160 can control to output an album cover or a singer image, which are applied to a file to the display unit 120, in addition to the title, artist, album, and year of the selected file. The controller 160 can control the processes so that the input unit 110 may be formed to have a different shape as the image displayed on the display unit 120 changes.

As shown in section "F", the controller 160 may set up an area corresponding to the full playing length of file, and can set up section "G" within section "F". Section "G" may be configured of the protrusions 200 which can move along section "F" by the user's touch, thereby providing a search function that a user can instantaneously select the playing of a given area during the playing of file. In section "G", after a user presses with a finger, when a power is added for moving, section "F" can be moved according to the direction of applied force. That is, if the controller 160 senses that the protrusion 200 of a specific direction of section "G" is applied with a power which is greater than other protrusions 200, the controller 160 controls the protrusions 200 which are placed nearby section "G" of the direction to which the power is applied to be protruded, whereas the controller 160 controls the protrusions 200 to which the power is not applied to be sunk, so that section "G" can be moved on section "F" similar to a domino mode. Here, sections "D", "E", and "F" were separately described. However, as described in the next paragraph, section "F" can be configured with section "D" and section "E".

For example, the controller 160 can control in such a manner that the playing of a file corresponding to a spot in which a pertinent contact is generated can be performed while the protrusions 200 of an area to which a user contacts among section "D" and section "E" are protruded. That is, the input unit 110 does not set up a separate section "F", but can replace the function that section "G" moves along on section "F" by using section "D" and section "E".

Figure 7:
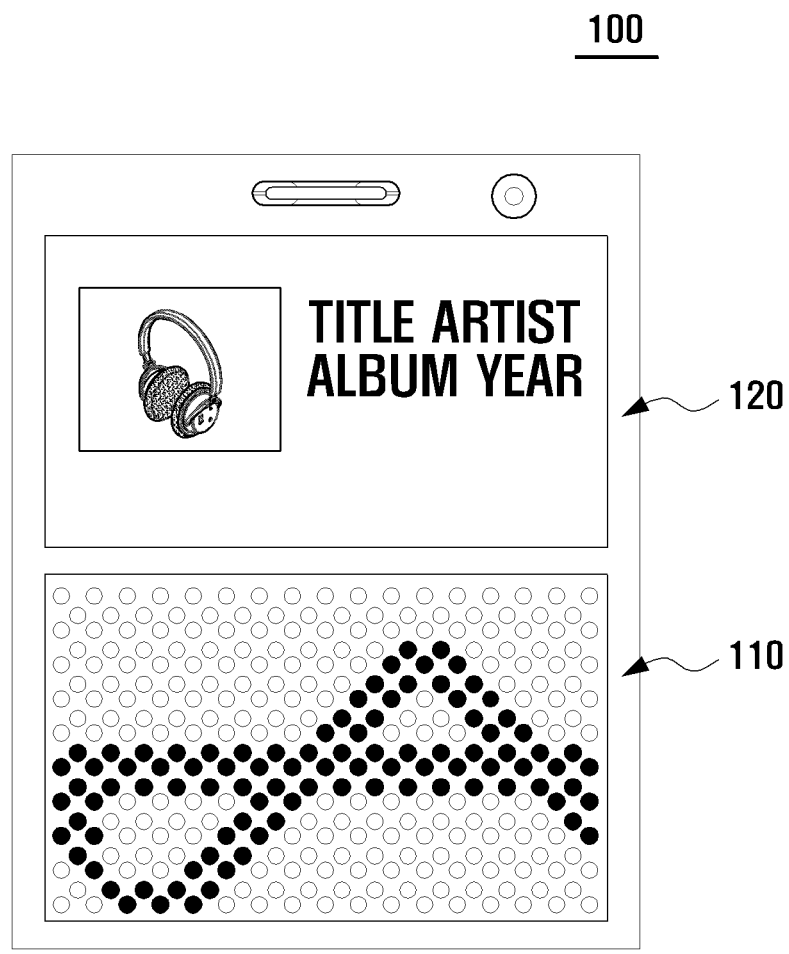
FIG. 7 is a drawing illustrating an input unit according to a file playing operation according to an exemplary embodiment of the present invention.

FIG. 7 is a drawing illustrating a structure of an input unit according to a music file playing among functions of a terminal according to an exemplary embodiment of the present invention.

Here, a black point dot in drawing indicates that the protrusions 200 are protruded or sunk in comparison with neighboring protrusions 200. Referring to FIG. 7, in order to activate a music file play function among functions of the terminal 100, when a user selects a music file stored in the storage based on an interface mode used for file playing and presses a play button as described above, the shape of the input unit 110 can be configured in the form of musical characteristics of the file, for example, in the form of an equalizer. The input unit 110 having the equalizer shape can be identically configured with an image screen according to an equalizer function on the display unit 120, while it can be configured independently although an image screen according to a relevant function is not outputted to the display unit 120.

To this end, while a specific file is being played, the controller 160 collects an equalizer image of a corresponding music file, and matches the collected equalizer image to each process of the input unit 110. Thereafter, according to the change of image, the controller controls the input unit 110 in such a manner that each protrusion 200 successively is protruded or sunk, so that an active change of the protrusions 200 according to the equalizer image can be controlled on the input unit 110. In this process, the controller 160 may control the extent and color of the light emission of the light emitting diode 220 in each protrusion 200, so that more colorful and active input unit 110 can be configured. If the user contacts a specific spot of the input unit 110, the controller 160 can control to configure the input unit 110 for the playing control illustrated in FIG. 6. In this process, the controller 160 controls the input unit 110 for the playing control illustrated in FIG. 6 to output for a certain time. When a touch event is not generated for a certain time, the controller 160 may control the input unit 110 according to an equalizer function illustrated in FIG. 7 to be automatically configured.

That is, the input unit 110 can be changed to be adjusted to each interface mode in a form of input unit 110 while being converted from a specific user function support, for example, an interface mode for the menu function into another user function, for example, an interface mode for file search function. And, even with the same user function, for example, with the file playing function, the input unit 110 can support the input unit 110 of another shape according to the change of function, that is, can support an interface mode for the file playing control, and an additional function according to the file playing, for example, an interface mode according to an equalizer function. Moreover, in an interface mode for the playing control, the input unit 110 can be configured of an interface including a "play" button for the file playing over the whole matrix of protrusions 200. Alternatively, the input unit 110 can be configured of an interface including at least one of buttons for playing control such as the pause, the rewind, the fast forward, and the volume control buttons. In addition, the input unit 110 can also be configured of an interface including all buttons used for the play control.

Figure 8:
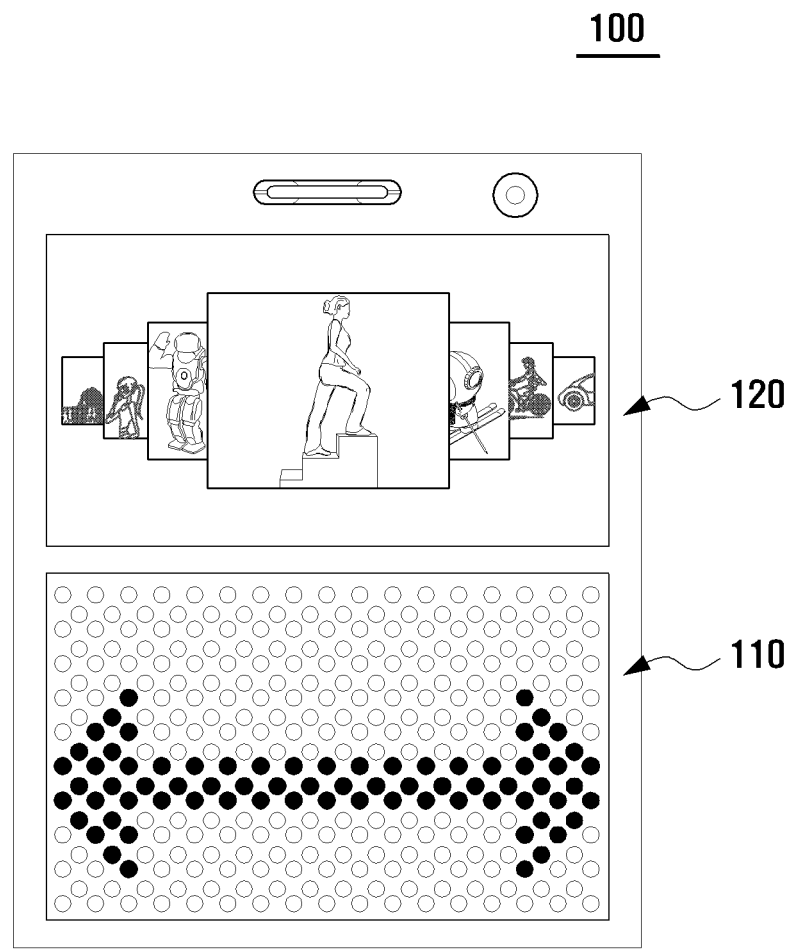
FIG. 8 is a drawing illustrating an input unit according to a file search operation according to an exemplary embodiment of the present invention.

FIG. 8 is a drawing illustrating a configuration of an input unit according to a photograph search function according to an exemplary embodiment of the present invention.

The input unit 110 of the terminal maintains an interface mode state including a button selecting a menu for a photograph search, and if an input signal for the menu item selection that searches a photograph among menus is inputted with a touch signal in an interface mode, an interface mode conversion for the photograph search be performed.

Referring to FIG. 8, in the interface mode that includes a menu for an image search like a photograph search, a user can touch a button corresponding to an item like the photograph search. If a touch for the photograph search is inputted, the input unit 110 can be configured of an interface including a button for a slide view as described below. If the user selects a slide view, as shown in the drawing, the display unit 120 can display the selected photograph so that it is larger than the other photographs, while the other photographs may be displayed as if they are disposed behind the selected photograph.

A user controls a button indicating the left direction or the right direction so as to search the photographs. In the input unit 110, the protrusions 200 can be protruded in such a manner that an interface having a button indicating the left direction or the right direction is formed in an interface mode that includes a slide view button. That is, if a user selects a slide view of the photograph search function, the controller 160 of the terminal 100 outputs the photos stored in the storage and controls the motor/diode driving unit 150 to protrude the protrusions 200 so as to indicate the left arrow and the right arrow.

In this process, the controller 160 may control the power supply so as to illuminate the light emitting diodes 220 of the protrusions 200 protruded to form the arrow shape, so that a user can more easily recognize the arrow shape. Here, the arrow shape protruded in the input unit 110 is configured of a form that the left arrow and the right arrow are continuously connected, however, the input unit 110 can be configured of various shapes. Accordingly, according to exemplary embodiments of the present invention, it should be understood that the shape of input unit 110 changes according to a function of the terminal.

In the above-described description, rather than protrude or sink protrusions 200, the input unit 110 may form the arrow shape by only illuminating protrusions 200 used to form the arrow shape. And if a user touches a corresponding area, the terminal controls the protrusions 200 which will be included in an arrow shape area to totally protrude or sink.

Figure 9:
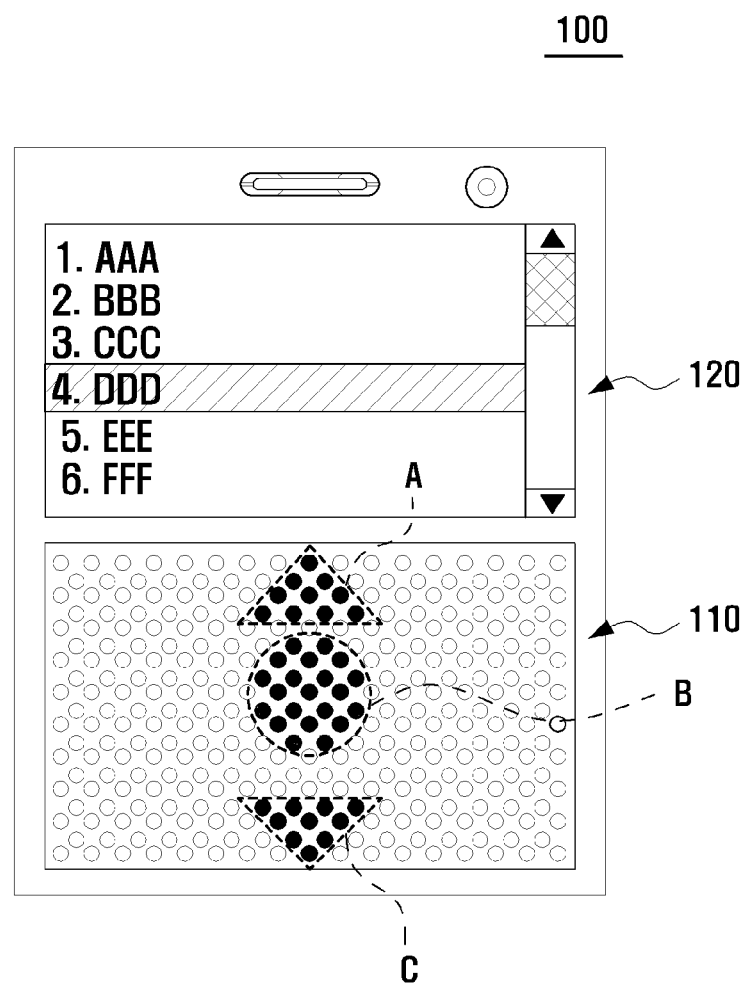
FIG. 9 is a drawing illustrating an input unit according to a list search operation according to an exemplary embodiment of the present invention.

FIG. 9 is a drawing illustrating a shape of an input unit for a list search and a selection according to an exemplary embodiment of the present invention.

Here, each circle corresponds to each protrusion 200, and a circle indicated as black indicates a protrusion 200 that is protruded or sunk more than the neighboring protrusion 200, whereas a circle indicated as white indicates a protrusion 200 that is not protruded or sunk but maintains an initial state. Referring to FIG. 9, the input unit 110 of the terminal activates an interface mode in which a menu is activated so that the user can select a specific file or image, while the controller 160 senses the user's touch signal for the search of files or images stored in the storage among the activated menu. The terminal 100 searches files and images stored in the storage in response to the user's request and outputs a list corresponding to pertinent files and images to the display unit 120.

Here, if the number of the searched files and images is more than the number of files and images that can be displayed in one screen of the display unit 120, as shown in drawing, the terminal 100 displays a scroll bar on the right side, so that it can indicate that files and images that are additionally searched exist in addition to the files and images that are displayed on the display unit 120. Then, by using a key that can use a scroll bar, a user can search the list of all files and images and can select a specific file and image that the user wants by using a specific key. In this case, the controller 160 checks the usage of a screen outputted to the display unit 120 in the menu selection step, that is, checks whether it is outputted as a usage of list search of use. In case the items as illustrated in the display unit 120 is indicated as a list, the controller 160 can control to implement the shape of the input unit 110 with an interface having the shape for the list search.

In more detail, in order to search a list, a direction key that can search a plurality of items up and down, or from side to side, and a verification key for selecting a highlighted item are provided. Accordingly, the controller 160 divides a matrix area in a certain part of the input unit 110 to be an interface including at least one of buttons corresponding to a direction key, which can move the highlight up, a direction key, which can move the highlight down, and a verification key, which can select the highlighted item, and protrudes or sinks the protrusions 200 of a corresponding area that is allocated to each divided zone. The areas corresponding to the up and down direction keys and the verification key may be pre-set in the terminal 100. A designer sets up the protrusions 200 of a specific area in advance to be protruded or sunk in the activation of a function like a list search.

Accordingly, in the activation of list search function, the storage stores an interface mode that maps the upper direction key to section "A", maps the verification key to section "B", and maps the lower direction key to section "C", and can send this interface mode to the controller 160 under the control of the controller 160. After receiving a corresponding interface mode from the storage, based on this, the controller 160 can configure the shape of the input unit 110. Here, for the sake of convenience in illustration, only the shape of the input unit 110 corresponding to the upper direction key and the lower direction key is illustrated. However, other configurations are possible. For example, in the state where a plurality of images are displayed on one screen like a multi image search, the input unit 110 can additionally form a direction key including a left direction key, a right direction key, and a diagonal direction key as well as the upper direction key and the lower direction key in the interface implementation.

Moreover, as illustrated in FIG. 5A and FIG. 5B, the controller 160 may control protrusions 200 to form a button corresponding to each key for a certain time, and to return to the state having the same height and color, thereafter, controls to form a button corresponding to a pertinent key in the touched area, in the touch generation of a user. Here, the controller 160 can determine the height of protruding or sinking of protrusions 200 that form a button according to a pressure, in addition to the touch area, and can determine the color and brightness of the emitted light.

Figure 10:
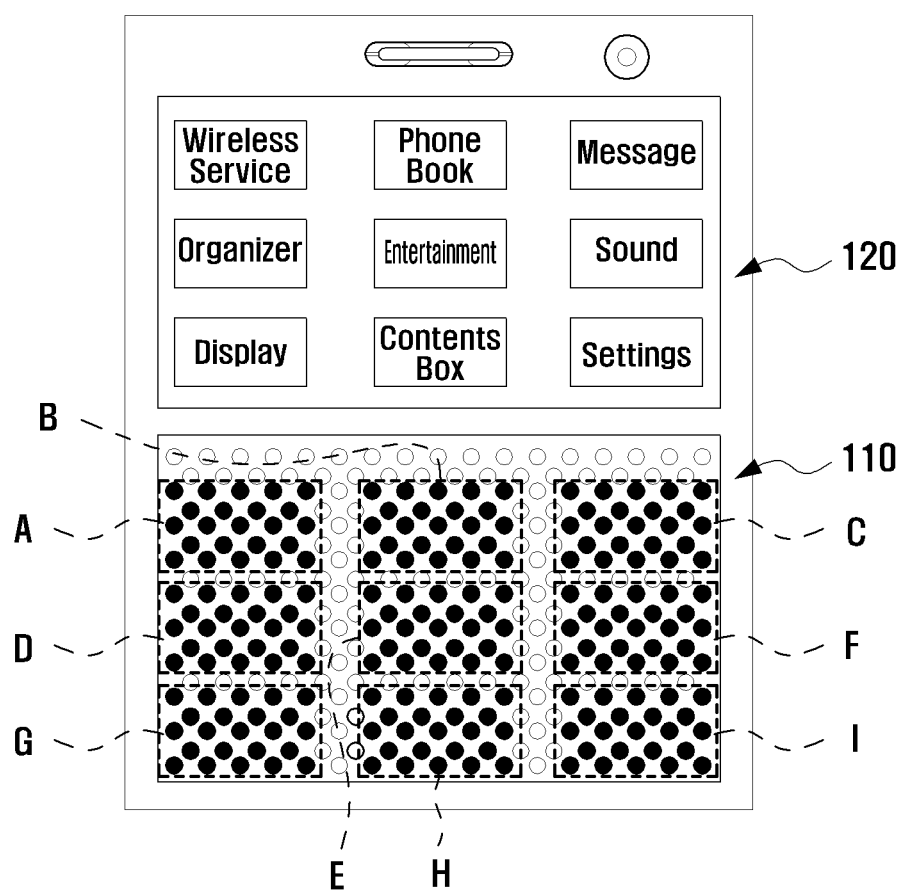
FIG. 10 is a drawing illustrating an input unit according to a menu item operation according to an exemplary embodiment of the present invention.

FIG. 10 is a drawing illustrating a shape of an input unit for menu selection according to an exemplary embodiment of the present invention.

It is assumed that each circle in an input unit 110 area shown in drawing indicates each protrusion 200 and a circle expressed with a black dot indicates a protrusion 200 that is protruded or sunk, while a circle expressed with white indicates a protrusion 200 that is not protruded or sunk but maintains an initial state. Referring to FIG. 10, a user activates a menu for the use of a terminal function. If the user sends the request for the menu activation to the terminal 100, the terminal 100 outputs an icon corresponding to a relevant menu to the display unit 120. The terminal 100 configures an input unit 110 corresponding to each icon displayed on the display unit 120. Here, when the user needs to have a button for activating the terminal 100 menu, the terminal 100 can implement an interface mode having a button corresponding to the menu on the input unit 110, and can configure a shape of the input unit 110 with an interface mode as illustrated while outputting an icon according to the menu activation as illustrated in FIG. 10 to the display unit 120, when the user activates a corresponding button. To this end, the controller 160 of the terminal 100 collects information of the arrangement of the menu icons outputted to the display unit 120, and determines protrusions 200 to be protruded and protrusions 200 to maintain the current state among protrusions 200 of the matrix type formed in the input unit 110. And if a menu icon is outputted to the display unit 120, the controller 160 sets up each area corresponding to the menu icon outputted to the display unit 120.

In more detail, the controller 160 controls the protrusions 200 allocated to each section to implement an interface mode having section "A" setting of the input unit 110 corresponding to "Wireless Service" item displayed on the display unit 120, section "B" setting of the input unit 110 corresponding to "Phone Book" item, section "C" setting of the input unit 110 corresponding to "Message" item, section "D" setting of the input unit 110 corresponding to "Organizer" item, section "E" setting of the input unit 110 corresponding to "Entertainment" item, section "F" setting of the input unit 110 corresponding to "Sound" item, section "G" setting of the input unit 110 corresponding to "Display" item, section "H" setting of the input unit 110 corresponding to "Contents Box" item, and section "I" setting of the input unit 110 corresponding to "Settings" item. In this process, the controller 160 can determine the illumination of the protrusions 200 of the protruded area. That is, in order to increase the recognition of the protrusions 200 that are protruded, the controller 160 may control the power supplied to the light emitting diodes 220 included in the protruded protrusions 200, and accordingly, the protruded protrusions 200 can emit light.

Figure 11:
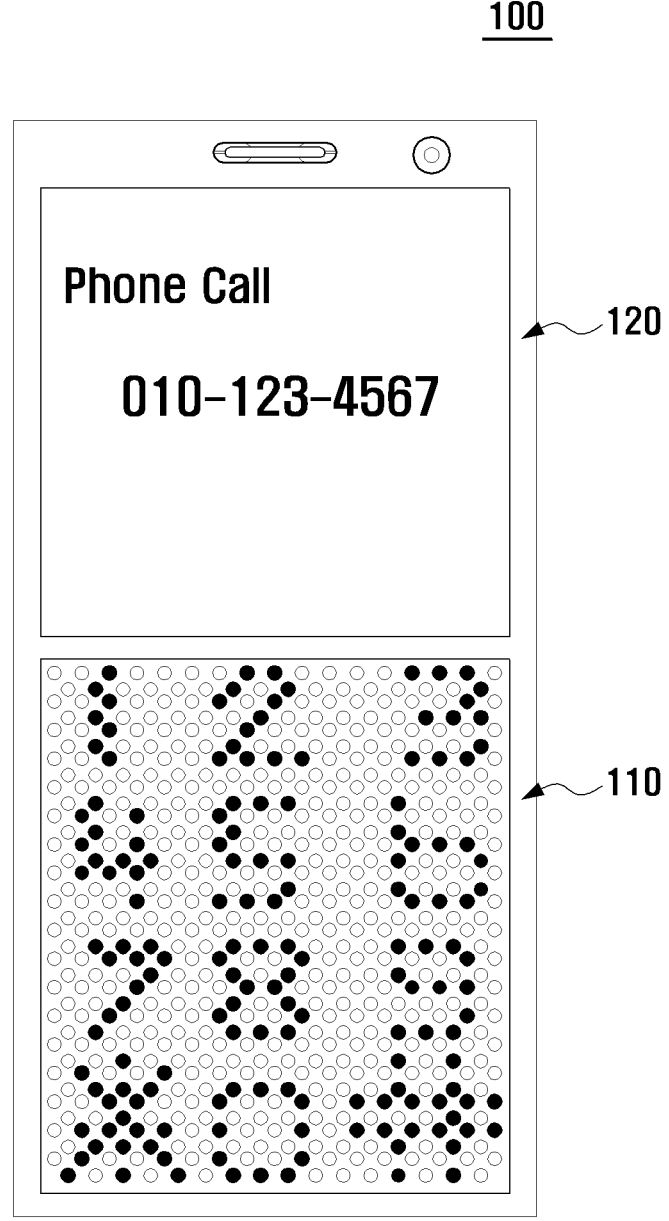
FIG. 11 is a drawing illustrating an input unit according to a phone call function operation according to an exemplary embodiment of the present invention.

FIG. 11 is a drawing illustrating the formation of input unit according to a phone call function according to an exemplary embodiment of the present invention.

It is assumed that each circle displayed on the input unit 110 corresponds to each protrusion 200 and a circle expressed with a black dot indicates a protrusion 200 that is protruded or sunk, while a circle expressed with white indicates a protrusion 200 that is not protruded or sunk but maintains an initial state. Referring to FIG. 11, in order to support the terminal 100 phone call function, the controller 160 of the terminal 100 can control to form an interface mode including a button for the input of a number used for the phone call function in the input unit 110. To this end, the controller 160 divides the whole input unit 110 into areas that can input ten numbers and two special characters, respectively, and can control each protrusion 200 in such a manner that a button having a form of a corresponding number, for example, "1, 2, 3, 4 . . . . 9, 0" and special characters "*, #" is formed in the divided area. A user can touch buttons formed on each area. The controller 160 can control to output the number corresponding to each touched button on the display unit 120. Here, after dividing the input unit 110 into twelve areas, the controller 160 may sink the protrusions 200 of number shape when displaying a number to each area, so that key buttons of intaglio shape can be provided. The controller 160 controls to supply power to the light emitting diode 220 included in the protrusions 220 that are protruded or sunk to emit light such that the ability to recognize the protrusions 220 forming the number or character type can be enhanced.

In the state where the protrusions 200 indicating a specific number or character are pressed for a certain time, that is, when a user inputs a long key, the terminal 100 can control to activate a phone call function by using a number that is set up as a shortcut key for a corresponding number or character. Although not shown in FIG. 11, the input unit 110 can further assign an area of the protrusions 200 corresponding to a send button and an end button for the activation of phone call function, after the input of a number.

As described above, exemplary embodiments of the present invention form a shape on the input unit by protruding, sinking, maintaining, and/or illuminating protrusions. It should be understood that each interface mode may be implemented using each method for forming a shape. For example, a shape may be formed on the input unit by only illuminating select protrusions, by only protruding select protrusions, or by only sinking select protrusions. Further, a shape may be formed on the input unit by both protruding and illuminating select protrusions or by both sinking and illuminating select protrusions.

As described above, the input unit of the terminal according to exemplary embodiments of the present invention includes an interface mode for the support of a phone call function, an interface mode for the support of a menu function, an interface mode for the support of a file search function, an interface mode for the playing of a file, an interface mode for the support of scrolling, an interface mode for inputting data including a number or a character, and a window mode corresponding to images displayed on the display unit. Moreover, if a camera function is included in the terminal, the input unit can be configured with an interface mode including a button used for the support of the camera function. And if the terminal includes a navigation function, an interface mode including a button used for the support of the navigation function can be implemented. In other words, the input unit according to exemplary embodiments of the present invention supports an interface mode respectively which is different according to the support of various user functions of the terminal. Even in the same interface mode, the input unit dynamically reacts on a real-time basis according to the touch input of a user and can configure other interface modes, and can further provide a visual effect by using the light emitting diodes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method comprising: determining an interface mode corresponding to an application being executed by a terminal; determining, based on the interface mode, shapes for input keys associated with functions for controlling the application; and causing, at least in part, displaceable units to be offset from a surface of the terminal to form patterns of displaceable units corresponding to the shapes, wherein each shape is different and indicative of a different one of the functions.

2. The method of claim 1, wherein at least some of the displaceable units are configured to positively and negatively displace from the surface.

3. The method of claim 1, further comprising: detecting a change in content displayed in association with the application; and causing, at least in part, at least one aspect of at least one of the input keys to be modified based on the change.

4. The method of claim 3, wherein the at least one aspect corresponds to at least one of the shape of the at least one input key, a position of a feature of the at least one input key, and the function associated with the at least one input key.

5. The method of claim 1, further comprising: detecting user interaction with at least one of the input keys; and causing, at least in part, the at least one input key to be further offset from the surface based on at least one aspect of the user interaction.

6. The method of claim 5, wherein the at least one aspect corresponds to one or more magnitudes of pressure applied to one or more portions of the at least one input key.

7. The method of claim 1, further comprising: detecting user interaction with at least one of the input keys; and causing, at least in part, the function and the shape of the at least one input key to be modified in association with the application and in response to detecting the user interaction.

8. An apparatus comprising: an array of displaceable units configured to be offset from a surface of the apparatus; and a controller configured to: determine an interface mode corresponding to an application executed in association with the apparatus, determine, based on the interface mode, shapes for input keys associated with functions for controlling the application, and cause, at least in part, a plurality of the array of displaceable units to be offset from the surface of the apparatus to form patterns of displaceable units corresponding to the shapes, wherein each shape is different and indicative of a different one of the functions.

9. The apparatus of claim 8, wherein at least some of the array of displaceable units are configured to positively and negatively displace from the surface.

10. The apparatus of claim 8, wherein the controller is further configured to: detect a change in content displayed in association with the application; and cause, at least in part, at least one aspect of at least one of the input keys to be modified based on the change.

11. The apparatus of claim 10, wherein the at least one aspect corresponds to at least one of the shape of the at least one input key, a position of a feature of the at least one input key, and the function associated with the at least one input key.

12. The apparatus of claim 11, wherein the at least one aspect corresponds to one or more magnitudes of pressure applied to one or more portions of the at least one input key.

13. The apparatus of claim 8, wherein the controller is further configured to: detect user interaction with at least one of the input keys, and cause, at least in part, the at least one input key to be further offset from the surface based on at least one aspect of the user interaction.

14. The apparatus of claim 8, wherein the controller is further configured to: detect user interaction with at least one of the input keys; and cause, at least in part, the function and the shape of the at least one input key to be modified in association with the application and in response to detection of the user interaction.

\* \* \* \* \*